Aug. 24, 1965  W. J. O'BRIEN  3,202,993
RADIO NAVIGATION SYSTEMS
Filed Jan. 30, 1961

| | NORMAL | INTERRUPTION |
|---|---|---|
| MASTER | 6f | 5f |
| RED | 8f | 9f |
| GREEN | 9f | 8f |
| PURPLE | 5f | 6f |

United States Patent Office 3,202,993
Patented Aug. 24, 1965

3,202,993
RADIO NAVIGATION SYSTEMS
William Joseph O'Brien, London, England, assignor to Decca Limited, a British company
Filed Jan. 30, 1961, Ser. No. 85,640
Claims priority, application Great Britain, Feb. 15, 1960, 5,375/60
16 Claims. (Cl. 343—105)

This invention relates to phase comparison radio navigation systems having spaced master and slave transmitters radiating radio frequency signals which are received at a mobile receiver, the receiver providing phase difference indications representative of a position or a position line. The invention is particularly applicable to systems in which normal transmissions are intermittently or occasionally interrupted to permit of an alternate transmission which is used to provide, at the receiver, the possibility of reducing the ambiguity of the normal transmissions arising from the fact that, with phase comparison navigation systems an integrating counter may have to be employed to count phase difference changes of complete cycles and a coarse positional determination may be necessary initially to set such an integrating counter correctly.

According to this invention, a radio navigation system comprises a master station radiating alternately two signals having a frequency difference $mf$ and two slave stations radiating alternately two signals having a frequency difference $nf$ where $m$ and $n$ are integers, each slave station radiating signals of one and then the other of the two frequencies, the two slave transmissions being switched synchronously so that the two slave stations always radiate different frequencies and wherein, at a mobile receiver, there are provided phase storage means for storing a representation of the phase of at least one of the signals from each station and separate phase indicating means associated with each slave station utilizing a stored signal and the alternately transmitted signal from its associated slave station and master station to determine positional lines with respect to a pattern of equiphase lines between the master station and the said slave station equivalent to the pattern which would be provided if the master station radiated a signal of the difference frequency $mf$ and the slave station radiated a signal of the difference frequency $nf$, phase locking means being provided at the radiating stations to lock the radiated signals from each station in phase with one another and to lock the phase of the radiations from the three stations to maintain said equiphase pattern fixed with respect to the radiating stations. Generally it will be convenient to use frequencies such that $m$ and $n$ are equal.

In one form of phase comparison navigation system within the scope of the invention, there are provided a master station radiating alternately two signals of frequency $m_1f$ and $m_2f$ where $m_1$ and $m_2$ are different integers and a pair of slave stations each radiating alternately signals of frequency $n_1f$ and $n_2f$ where $n_1$ and $n_2$ are different integers differing from $m_1$ and $m_2$, the two slave station transmissions being switched synchronously so that the two slave stations always radiate different frequencies and all the radiated signals being locked in phase and wherein, at a mobile receiver, phase storage means are provided for storing a representation of the phase of at least one of the signals from each station whereby, by utilizing a stored signal and the alternately transmitted signal from each station, phase indications can be made to determine positional lines with respect to hyperbolic patterns between the master station and each of the two slave stations equivalent to the patterns which would be obtained if the master station radiated a signal of the difference frequency between $m_1f$ and $m_2f$ and if each of the slave stations radiated a signal of the difference frequency between $n_1f$ and $n_2f$. Conveniently $m_1$ and $m_2$ have a difference equal to the difference between $n_1$ and $n_2$.

According to one aspect of the invention, in a phase comparison navigation system, there are provided a master station radiating alternately two signals of frequency $m_1f$ and $m_2f$ where $m_1$ and $m_2$ are different integers having a difference of unity and a pair of slave stations each radiating alternately signals of frequency $n_1f$ and $n_2f$ where $n_1$ and $n_2$ are different integers differing by unity and differing from $m_1$ and $m_2$, the two slave station transmissions being switched synchronously so that the two slave stations always radiate different frequencies and all the radiated signals being locked in phase and wherein, at a mobile receiver, phase storage means are provided for storing a representation of the phase of at least one of the signals from each station whereby, by utilizing a stored signal and the alternately transmitted signal from each station, phase indications can be made to determine positional lines with respect to hyperbolic patterns between the master station and each of the two slave stations equivalent to patterns which would be obtained if $1f$ signals were radiated from all the stations. There may be provided a third slave station radiating alternately on frequencies $m_2f$ and $m_1f$ the transmissions being switched synchronously with the master transmissions so that the master and third slave always radiate different frequencies. It will be seen that, in this system, only one signal at a time is radiated from each station and only four frequencies are used. The transmissions can be used at the receiver to provide an accurate position determination and also provide a coarse position determination by providing the equivalent of $1f$ transmissions from the stations while requiring only one transmission at a time from any station with a simple two frequency switching arrangement. Substantial economy in weight and reduction in complexity of the apparatus is achieved compared with prior types of equipment giving equivalent results and thus this arrangement is of particular value for a portable radio navigation system such as might be used for survey work.

Preferably the alternate transmissions comprise relatively long duration periods of normal transmission with shorter duration periods of radiation on the alternate frequencies. The mobile receiver may be arranged to effect a fine position determination during the periods of normal transmission and to effect a coarser determination, to resolve any ambiguities in the finer determination, during the shorter duration periods of alternate operation.

Considered from another aspect, the invention also includes within its scope a radio navigation system in which a position line is determined by indicating the difference in time of propagation to a mobile receiver of signals emitted from spaced master and slave transmitting stations, wherein the master station is arranged to radiate alternately signals of frequency $m_1f$ and $m_2f$ where $m_1$ and $m_2$ are integers differing by one and $f$ is the fundamental frequency of the system and wherein the slave station is arranged to radiate alternately signals of frequency $n_1f$ and $n_2f$ where $n_1$ and $n_2$ are integers differing by one, and wherein the mobile receiver comprises means for separately receiving the radiated signals of different frequency, a first phase preserving means for preserving the phase of the received $m_1f$ signal from the master station during the transmission of the $m_2f$ signal, means for utilizing the phase preserved by the first phase preserving means and the received $m_2f$ signal to maintain a unique phase relation between the pulses from a pulse generator at a $1f$ repetition rate and the received master transmissions, and a second phase preserving means converting information from the received slave signals of frequency $n_1f$ into a retained phase reference utilized in conjunction with the received $n_2f$ signals and said pulses at a $1f$ repetition rate to provide an indication of a position line in fractional units of measurement equivalent to the units provided by the phase difference in transit time of slave and master signals each having a virtual frequency of $1f$. The factors $m_1$ and $m_2$ may be different from $n_1$ and $n_2$, in which case two slave stations may operate alternately on frequencies $n_1f$ and $n_2f$, the frequency switching being such that the two slave stations always radiate different frequencies, to enable two position lines to be obtained. Alternatively or additionally as a further slave, the factors $m_1$ and $m_2$ may be the same as $n_2$ and $n_1$ respectively, in which case the frequency switching at the two stations radiating the frequency $m_1f$ and $m_2f$ must be synchronized so that the two stations always radiate different frequencies.

Preferably the frequencies $m_1f$ and $n_1f$ are normally transmitted with short periods of the alternate transmissions on frequencies $m_2f$ and $n_2f$.

The first phase preserving means may be arranged to receive phase adjustment from the received $m_1f$ master signal in order to preserve a master phase reference for use during the periods of the alternate transmissions and there may be provided indicating means indicating the phase relationship between the alternate master transmission and the preserved master phase reference and means for utilizing this indicated phase difference to establish a unique phase relation between an uninterrupted source of pulses of $1f$ repetition rate and the two received master signals.

There may be provided phase indicating means indicative of the phase relation between the received slave signal of frequency $n_1f$ and the phase of the $n_1$th harmonic component of the $1f$ pulses thereby providing a phase indication defining a line of position in fractional units of measurement equivalent to the units provided by the phase difference in transit time of slave and master signals each having a virtual frequency of $n_1f$. This phase indicating means thus provides an indication with respect to a finer pattern than indication at an equivalent $1f$ frequency.

The second phase preserving means may include means arranged to receive phase adjustment from the received $n_1f$ slave signal in order to preserve the phase of this signal during the time of transmission of the $n_2f$ signal.

The invention also includes within its scope a radio navigation system in which a position line is determined by indicating the difference in time of propagation to a mobile receiver of signals emitted from spaced master and slave transmitting stations, wherein the master station is arranged to radiate alternately signals of frequency $m_1f$ and $m_2f$ where $m_1$ and $m_2$ are integers differing by one and $f$ is the fundamental frequency of the system and wherein the slave station is arranged to radiate alternately signals of frequency $n_1f$ and $n_2f$ where $n_1$ and $n_2$ are integers differing by one, and wherein the mobile receiver comprises means for separately receiving the radiated signals of different frequency, a generator generating pulses of a repetition frequency, of $1f$ to have harmonic components of frequencies $m_1f$, $m_2f$, $n_1f$ and $n_2f$ in fixed phase relationship, means for controlling the generator to maintain a fixed phase relationship between the received $m_1f$ signals and the $m_1f$ component of the pulses, means for controlling the pulses to obtain a fixed phase difference between the received $m_2f$ signal and the $m_2f$ component of the pulses, a first phase discriminator providing an indication representative of the phase difference between the phase of the received $n_1f$ signal and the phase of the $n_1$th harmonic of the $1f$ pulses and a second phase discriminator providing an indication representative of the phase difference between a difference phase of the received $n_1f$ and $n_2f$ signals and the phase of the $1f$ component of the $1f$ pulses. The first discriminator can give an indication of phase with the reading being a fractional phase difference as given by $\lambda_1/d$ where $\lambda_1$ is the wavelength of an $n_1f$ signal and $d$ is the difference of distances to the master and slave stations. The second discriminator can give an indication of phase with the reading being a fractional phase difference as given by $\lambda_2/d$ where $\lambda_2$ is the wavelength of a $1f$ signal.

The total number of ambiguities that can be resolved by the second discriminator with respect to an indication using only the frequencies $m_1f$ and $n_1f$ is equal to the least common multiple of $n_1$ and $m_1$. More generally, in a system in which all the radiated signals are harmonically related, the number of ambiguous possibilities within a phase difference equivalent to one cycle of the fundamental is equal to the lowest common multiple of two integers, one of which is the harmonic number of the distinctive derived signal from the transmissions from one station and the other of which is the harmonic number of the distinctive derived signal from the transmissions from the second station. Thus if $6f$ is transmitted from one station and $8f$ from the other, then the lowest common multiple would be 24; a comparison signal of $24f$ may be derived from the one station by multiplying the frequency of the signals received from that station by 4 and a second comparison signal of $24f$ may be derived from the other station by multiplying the frequency of the signals from said other station by 3. An additional transmission of $5f$ from said one station will permit the extraction of a derived $1f$ signal. The harmonic number of this $1f$ signal is one and thus the lowest common multiple of the harmonic numbers is now 8. The arrangement will thus permit of an effective comparison as if signals of frequency $8f$ where radiated from each station. This comparison may be done by multiplying the derived $1f$ signal by 8 and comparing the resultant $8f$ signal with the received $8f$ signal. An additional $9f$ signal from said other station will permit of the extraction of a derived $1f$ signal. Thus, with a derived $1f$ signal from each station, the system is unambiguous within a cycle of phase difference at the fundamental frequency.

In a case where the normal transmission are only at frequencies $6f$ and $8f$, it has been shown that there is a 24 to 1 ambiguity to be resolved in minimizing the ambiguity. An error of one part in 48 in the coarse indication will thus introduce another ambiguity. As the coarse indication is dependent in substantially equal ways on four different signals, a phase shift of $$\frac{1}{4 \times 48}$$

of a cycle or 1⅞ degrees in each signal can produce an ambiguous result. As an error of 1⅞ degrees can result from a skywave interference signal of 3.3% of the ground wave signal, it will be seen that a single coarse pattern as a reliable manner of resolving ambiguity has a very small safety factor. However, by introducing an intermediate pattern having a distinctive frequency (i.e., characteristic pattern frequency) equal to one of the transmitted frequencies, the identification tolerance with regard to phase accuracy and skywave interference can be greatly increased.

The invention also includes within its scope a radio navigation system having a master station transmitting signals of at least one frequency $m_1f$ where $m_1$ is an integer and $f$ the fundamental frequency of the system and two slave stations each transmitting two signals alternately of frequencies $n_1f$ and $n_2f$, where $n_1$ and $n_2$ are different integers different from $m_1$ and with the difference between them less than either of them, each frequency being radiated only by one station at a time and all the transmissions being locked in phase, and wherein a mobile receiver includes means for storing representations of the phases of the $n_1f$ and $n_2f$ signals radiated simultaneously by the slave stations during one of the alternate periods of operation and means operative during the other alternate periods of operation for utilizing the stored phase representations with the received signals to determine the phase relation between virtual signals of frequency $(n_1-n_2)f$ radiated from each of the slave stations and signals derived from the received master transmissions.

The invention still further includes a mobile receiver for a phase comparison radio navigation system having a master station and two or more slave stations, at least each slave station radiating on two different frequencies in alternate periods, each station radiating only one frequency at a time and all the radiated signals being locked in phase, said mobile receiver including a separate storage means for each slave station, which storage means are operative simultaneously during one of the alternate periods to receive different frequency signals from the different slave stations and to store information representative of the phases of these different frequency signals and means for utilizing the stored information in conjunction with the signals received during the next period when the stations are transmitting on different frequencies to provide, at the receiver, information representative of the phases of virtual transmissions at frequencies equal to the differences of the frequencies of the two transmissions from each slave station for phase comparison with signals received from the master station or derived signals phase locked to such received master signals.

In the following description, reference will be made to the accompanying drawings in which.

The particular embodiment of the radio navigation system about to be described makes use of a master transmitting station and either two or three slave stations, the slave stations being spaced from the master station. If three slave stations are employed they may be situated for example around the master station. The radio frequency transmission from these stations are utilized by a receiver on a vehicle, for example a ship or aircraft, to determine the location of the receiver. The master station normally transmits continuous wave signals of a frequency $6f$ where $f$ is the fundamental frequency of the system. Periodically these $6f$ transmissions from the master station are interrupted for a short period and are replaced by transmission of a frequency $5f$. Reference will be made more particularly to a system with three slave stations which for convenience are referred to as the red, green and purple slaves and which normally transmit continuous wave signals of frequencies $8f$, $9f$ and $5f$ respectively. During the short periods when the master station transmits at a frequency $5f$, the red, green and purple slaves transmit respectively at frequencies of $9f$, $8f$, and $6f$. It will thus be seen that the master and the purple slave share two frequencies $6f$ and $5f$ which are transmitted alternately, one frequency at a time from each station, with the two stations on different frequencies, while the red and green slaves share two frequencies $8f$ and $9f$ which are transmitted alternately, one frequency at a time from each station with the two stations on different frequencies. As will be apparent from the following description, a fixed phase relationship is preserved between the transmissions to enable positional information to be obtained at the mobile receiver by a phase comparison of signals derived from or controlled by the received transmissions. If only two slave stations are required in addition to the master, it is particularly convenient to utilize only the red and green slaves.

Figure 1:
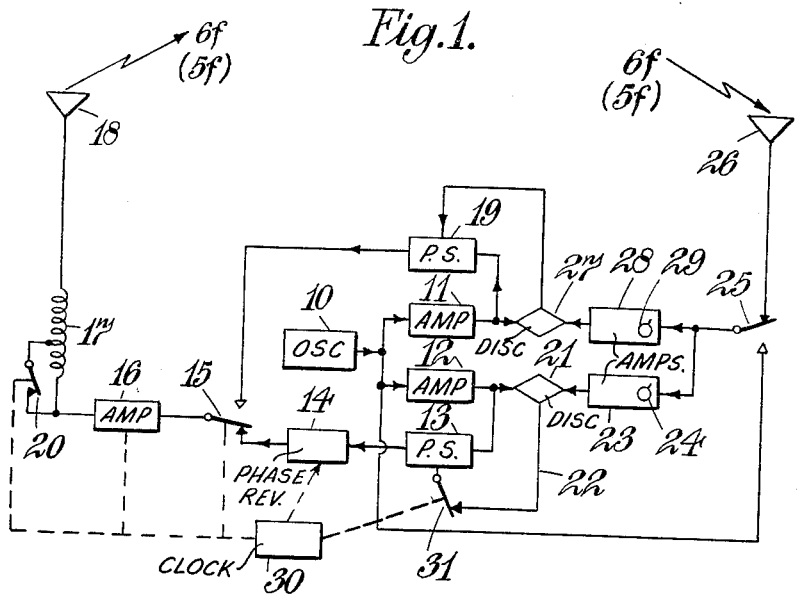
FIGURE 1 is a block diagram illustrating a master transmitting station of a phase comparison radio navigation system.

Referring to FIGURE 1, the master station has a master oscillator and pulse generator 10 which controls the frequency of all the radiated signals. The master oscillator consists of a highly stable oscillator and the unit 10 gives a pulse output at a repetition frequency $f$ which is the fundamental frequency of the system. This pulse output is fed to two frequency selective amplifiers 11, 12 which amplify respectively the harmonic component signals of frequency $5f$ and $6f$. During normal transmission times, a sine wave output of frequency $6f$ from amplifier 12 is passed through a phase shifter and amplifier 13 which alters the phase of the sine wave signal by an amount dependent on the magnitude of an applied direct voltage control signal. From this phase shifter and amplifier 13 the $6f$ signal passes through a phase reversal switching means 14, a switch 15, a power amplifier 16 with switchable tuning and a tuning coil 17 to a transmitting antenna 18.

During the shorter duration alternate periods of transmission, the $5f$ sine wave output from amplifier 11 is passed through a phase shifter and amplifier 19 which alters the phase of the sine wave signal by an amount dependent on the magnitude of a direct voltage control signal. From this phase shifter and amplifier 19, the $5f$ signal passes through the switch 15, power amplifier 16 and tuning coil 17 to the antenna 18. As will be explained hereinafter, the tuning of the power amplifier 16 is altered synchronously with the operation of the switch 15 to tune the power amplifier to the appropriate frequency during these alternate periods of transmission and also a switch 20 is opened to tune the coil 17 to the lower frequency.

The antenna 18 can thus transmit a signal of frequency $6f$ alternately with a signal of frequency $5f$. While the phase relationship of the radiated signals of frequency $5f$ and frequency $6f$ will be relatively stable for short periods, further control apparatus, to be described below, has to be provided to give long term stability and standardization of the phase relation.

To provide phase control of the radiated $6f$ signal, a phase discriminator 21 is provided giving a direct voltage output to lead 22 which is representative of the phase difference between the input to the amplifier 12 and the input to an amplifier 23, which latter amplifier is also tuned to the frequency $6f$ and incorporates an adjustable phase control indicated diagrammatically at 24. For referencing (i.e. standardizing the phase relationship), the inputs of the two amplifiers 12 and 23 are connected together by a switch 25 and the phase control 24 is adjusted to give a zero voltage output on lead 22. The switch 25 is then operated to connect the input of amplifier 23 to a receiving antenna 26 which picks up the signals radiated from the transmitting antenna 18. The discriminator 21 will then give an output voltage representative of the phase difference between the inputs to amplifiers 12 and 23 and this output voltage is applied to the phase shifter and amplifier 13 so as to adjust the phase of the output from amplifier 13 and hence of the radiated signal to keep the input to the amplifier 23 substantially in phase with the input to amplifier 12. It will be seen that this phase control system serves to hold the correct phase of the radiated signal with respect to the phase of the input to amplifier 12.

A similar phase control system is provided for the radiated $5f$ signal, this control system comprising a phase discriminator 27 giving an output representative of the phase relationship between the input to the amplifier 11 and the input to an amplifier 28 tuned to the frequency $5f$. This amplifier 28 has a phase control indicated diagrammatically at 29. The switch 25, for referencing, connects the input of the amplifier 28 to the input of amplifier 11 and, for phase control during transmission, connects the input of the amplifier 28 to the receiving antenna 26. This phase control of the $5f$ signal thus holds the correct phase of the radiated $5f$ signal with respect to the phase of the 5$f$ input to the amplifier 11. By this means a phase relationship is maintained between the transmitted 5$f$ and 6$f$ signals which is the same as the phase relationship between the 5$f$ and 6$f$ components of the pulse output of generator 10.

A clock mechanism 30 is provided for operating the various switches required for changing from the normal 6$f$ transmission to the alternate 5$f$ transmission. The timing of this change in transmissions has to be signalled to the slave stations and to the mobile receiver. If there were only red and green slaves and not a purple slave (which operates on the 5$f$ and 6$f$ frequencies), then the change in frequency of the master station transmissions could be used for controlling appropriate switches at the slave stations and the mobile receivers. In the particular system now being described, this is not possible and the start of the period of alternate transmission is signalled by a phase reversal for one tenth of a second of the 6$f$ signal passing through the phase reverser 14 which is provided for this purpose. In order to prevent any corrective change being applied by the phase control system to the radiated signal during this period, a switch 31 is provided in the phase control lead 22, which switch is opened during the one tenth of a second signalling period. Following this period, there is, in this particular embodiment, a transmission for one second of the alternate 5$f$ signal and thence a reversion to the normal transmission for a much longer period.

Figure 2:
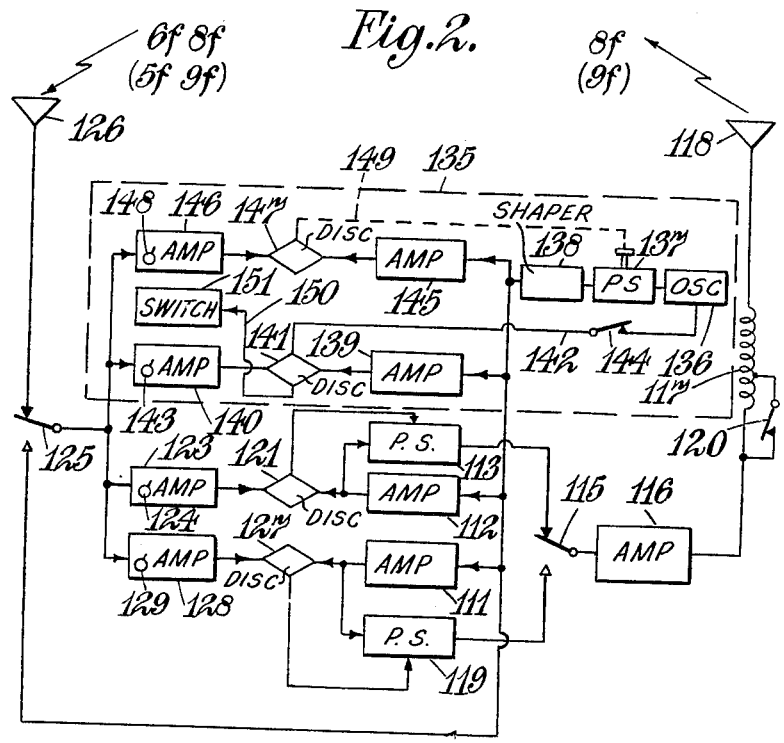
FIGURE 2 is a block diagram illustrating a slave station.

The red slave station is illustrated in FIGURE 2. This station normally radiates signals of frequency 8$f$ and, for the short periods of alternate transmission, radiates signals of frequency 9$f$. The transmitting and phase control equipment is basically similar to that employed at the master station and it will be seen from the following description that the units 111–113 and 115–129 described below correspond respectively with units 11–13 and 15 to 29 at the master station, the frequency 8$f$ being used however instead of 6$f$ and the frequency 9$f$ instead of 5$f$. There is no unit at the slave station corresponding to the phase reversal unit 14 at the master station since only the master station transmits a transmission timing synchronization signal. The amplifier 112 is tuned to the frequency 8$f$ and feeds the amplifier and phase shifter 113 in which the phase is shifted in accordance with the direct voltage output of phase discriminator 121 which compares the phase of the 8$f$ output from amplifier 112 with the 8$f$ output from amplifier 123, which amplifier incorporates a phase controller 124 for standardization. The amplifier 123 is fed with 8$f$ signals picked up by antenna 126 but, for standardization, may have its input connected to the input of amplifier 112 by switch 125. The amplifier 111 is tuned to the frequency 9$f$ and feeds the amplifier and phase shifter 119 in which the phase is shifted in accordance with the direct voltage output signal of phase discriminator 127 which compares the phase of the 9$f$ output from amplifier 111 with the 9$f$ output from amplifier 128, which amplifier incorporates a phase controller 129 for standardization. The amplifier 128 is fed with 9$f$ signals picked up by antenna 126 but, for standardization, may have its input connected to the input of amplifier 111 by switch 125.

At the slave station, instead of having a master oscillator and pulse generator 10 as at the master station, there has to be provided a source of pulses of 1$f$ recurrence frequency, the phase of which is controlled in accordance with the phase of the signals received from the master station. For this purpose, there is provided a source 135 of pulses of recurrence frequency 1$f$. This source 135 includes an oscillator 136 of frequency 1$f$ which feeds a six-step per cycle phase shifter 137 enabling the phase of the 1$f$ signals to be altered in six equal steps of 60°. The output of the phase shifter 137 is formed into pulses of recurrence frequency 1$f$ by a pulse shaper 138. The output pulses from the pulse shaper 138 can be considered as comprising a series of harmonics of the frequency $f$ in fixed phase relation and these pulses provide, inter alia, the 8$f$ and 9$f$ components for the previously mentioned amplifiers 112 and 111. In the slave station of FIGURE 2, these pulses have to be locked in frequency and phase to the pulses of frequency 1$f$ from the master oscillator and pulse generator 10 at the master station. To do this, the outputs of two 6$f$ amplifiers 139, 140 are fed to a phase discriminator 141, the output of which is applied by lead 142 to the oscillator 136 to control the frequency and phase of the oscillator 136. The amplifier 140 has an adjustable phase control 143 which is used to standardize the relative phase shifts through the amplifiers 139, 140, the inputs to the two amplifiers, for such standardization, being connected together by the aforementioned switch 125. When the inputs are connected together, the phase control 143 may be adjusted to give zero output voltage on lead 142 thereby ensuring that, when the switch 125 is in the normal operating condition, the discriminator 141 gives an output signal representative of the phase relation between the inputs to the amplifiers 139, 140. During such standardization, the lead 142 to the oscillator 136 is open-circuited by a switch 144. When the switch 125 is returned to the normal operating condition and switch 144 closed, the amplifier 140 is coupled to the receiving antenna 126 and is thereby excited by the 6$f$ signal received from the master station so that the output of the discriminator 141 will control the frequency and phase of the oscillator 136 to hold the 6$f$ component of the 1$f$ pulses from the pulse shaper 138 in phase with the received 6$f$ signal fed to the input of the amplifier 140 and hence in phase with the received 6$f$ signal from the master station. However, while the 6$f$ component of the 1$f$ pulse from the pulse shaper 138 at the slave station now has a fixed phase relation with the 6$f$ component of the 1$f$ pulse from the generator 10 at the master station, the phases of these 1$f$ pulses have six possible stable phase differences with the apparatus thus far described. To resolve the alternative conditions and to give a unique phase relationship between the 1$f$ pulses from the master station generator 10 and the slave station pulse shaper 138, there are provided two further amplifiers 145, 146 similar to the amplifiers 139, 140 respectively but tuned to the frequency 5$f$. The outputs of these two amplifiers are applied to a phase discriminator 147. The amplifier 146 has a phase control 148 which is adjusted, with the switch 125 in the standardizing position to connect together the inputs of amplifiers 145, 146, to give zero output voltage from the discriminator 147. During the periods of the alternate transmissions, the discriminator 147 will give an output representative of zero phase difference if the 5$f$ input to amplifier 146 is in phase with the 5$f$ component of the output pulses from the pulse shaper 138. A phase change of the 1$f$ pulse input from pulse shaper 138 of one sixth of a cycle at 1$f$ will result in an angular phase change of six times this magnitude, that is to say one complete cycle in the 6$f$ input to amplifier 139 which will have no effect on the discriminator 141 but will give a phase shift of 5/6 of a cycle in the 5$f$ input to amplifier 145. It will be seen therefore that there is only one phasing of the 1$f$ pulses from the pulse shaper 138 which will give zero output voltage from both discriminators 141 and 147. Any error in the pulse phasing will be equal in magnitude to the fractional phase error represented by the output of the 5$f$ discriminator 147. The output of the discriminator 147 might be applied to the phase shifter 137 for automatically removing this phase error, as indicated diagrammatically by the dashed line 149. In practice, however, since the phase locking will remain stable so far as the ambiguities due to the one sixth of a cycle phase steps are concerned, it will generally be sufficient merely to provide an indicator for indicating the output of the discriminator 147 and a manual control for adjusting the six-step phase shifter 137.

The phase discriminator 141 is arranged to provide outputs representative of both the sine and the cosine of the phase angle between the two input signals. The sine output is applied to the aforementioned lead 142 to control the oscillator 136. The cosine output on lead 150 is used to detect a rapid phase reversal by a voltage polarity sensitive circuit in a switching unit 151. This switching unit contains the various relays and other apparatus for altering the tuning and controlling the timing of the transmission of the time-synchronized alternate transmission. In particular this unit 151 controls the switches 115 and 120 and the tuning of the power amplifier 116. For clarity in the drawing the control lines between the unit 151 and the controlled switches 115 and 120 and amplifier 116 have been omitted. If the system employs a purple slave radiating on frequencies of 5f and 6f alternately the received purple slave signals must not affect the operation of the oscillator 136. For this purpose, the timing unit may be arranged to prevent the slave 5f transmissions received by the antenna 126 during normal transmissions and the shorter period alternate 6f signals from the purple slave from affecting the operation of the unit 135 which has to control the oscillator 136 in accordance only with the received master transmissions.

The green slave transmitter may be identical with the red slave transmitter shown in FIGURE 2 except that the green slave has to radiate 9f signals during the normal transmission periods and the 8f signals during the short periods of the alternate transmissions.

If a purple slave is employed, it may be similar to the red slave shown in FIGURE 2 except that a 5f signal has to be radiated during the normal transmission periods instead of the 8f of the red slave while, during the short period alternate transmissions, a 6f signal has to be radiated instead of the 9f radiated by the red slave. It will be seen that this merely requires the appropriate different tuning for the units 111–113, 116, 117, 119, 123 and 128.

Figure 3:
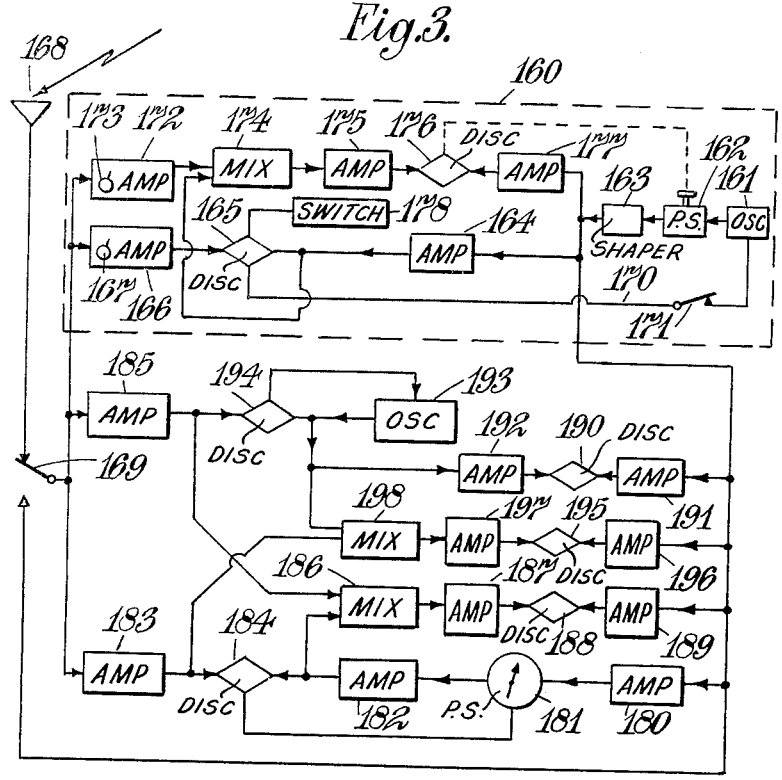
FIGURE 3 is a block diagram illustrating one form of receiving apparatus for use on a vehicle.

The receiver shown in FIGURE 3 is for use with a transmitting system having a master station and red and green slaves. The additional equipment required to utilize transmissions from a purple slave is explained with reference to FIGURE 4. In FIGURE 3, there is a unit 160 which is the exact equivalent of the unit 135 of FIGURE 2 in that it accepts the 6f and 5f signals received from the master station and produces pulses of a 1f repetition rate locked in frequency and phase with the received signals. In FIGURE 3, the unit 160 is not identical in detail with the unit 135 in order to illustrate an alternative construction for achieving the required result. In the unit 160 of FIGURE 3, there is shown a 1f oscillator 161, the output of which is fed through a six-step phase-shifter 162 to a pulse shaper 163. The output of the pulse shaper consists of short duration pulses containing a series of harmonics of the 1f frequency signal. The 6f component of this output is amplified by an amplifier 164 and fed to one input of a phase discriminator 165. The other input to this discriminator 165 is derived from a 6f amplifier 166 having a phase control 167. Normaly the ampifier 166 is excited by 6f signals from the master station received by a receiving antenna 168 but a switch 169 enables the input to the amplifier 166 to be connected to the input to the amplifier 164 for standardizing. The discriminator 165 provides sine and cosine outputs and the sine output is applied by lead 170 to the oscillator 161 to control the frequency and phase of the oscillator output. The lead 170 includes a switch 171 for interrupting the control circuit when the phase-reversed 6f signal is transmitted from the master station. It will be seen that the units 161–171 serve to provide, at the output of the pulse shaper 163, pulses of 1f recurrence frequency locked in phase and frequency to the 6f signals from the master station exactly as do the units 136–144 at the slave station. In the arrangement shown in FIGURE 3, however, the phase shifter 162 is not controlled by a discriminator operating at the frequency 5f. Instead, the received 5f signal is utilized in a heterodyne arrangement enabling the actual inputs to a phase discriminator to be at the frequency 1f. For this purpose there is provided a 5f amplifier 172 having a phase control 173. The 5f output from this amplifier is mixed in a mixer 174 with the 6f output from amplifier 166 to give a 1f output which is amplified in a 1f amplifier 175 and fed to one input of a phase discriminator 176. The other input to the discriminator is obtained from a 1f amplifier 177 excited by the output from the pulse shaper 163. The phase control 173 is adjusted with the input to amplifier 172 connected to the input to amplifier 177 by switch 169 to give zero output voltage on the discriminaor 176 and then the switch 169 is set to the normal operating condition in which the 5f signals received from the master station are fed to the amplifier 172. The discriminator 176 has an output indicator giving an indication exactly equal to that given by the discriminator 147 if the arrangement of block 135 of FIGURE 2 were employed. This output indication is used to control the adjustment of the phase shifter 162.

The discriminator 165 has both a sine output used for controlling oscillator 161 and a cosine output which is fed to a switching unit 178 to effect any necessary switching in synchronism with the switching at the transmitting stations. For clarity in the drawing, however, lines between this switching unit 178 and the elements controlled thereby have been omitted.

The unit 160 provides a continuous series of pulses at a repetition frequency of 1f having 6f and 5f components which are phase synchronized to the received master signals. These 1f pulses also contain 8f and 9f components and hence provide the equivalent of continuous 8f and 9f radiations from the master station, these equivalent signals bearing a fixed known phase relationship to the received master signals. In the receiver of FIGURE 3, the equivalent master 9f signal obtained from the pulse shaper 163 is applied to a 9f amplifier 180. The output of this amplifier is passed through a calibrated phase shifter 181 to the input of a 9f amplifier 182. The phase shifter 181 is a mechanical phase shifter having a continuously rotatable coil which can be driven, as hereinafter described, by a motor to effect phase shift of the signals passing through the phase-shifter. The output of the amplifier 182 is phase compared with the output of a 9f receiver channel amplifier 183 by means of a phase discriminator 184, the input of the amplifier 183 being coupled by the aforementioned switch 169 to the antenna 168 for normal operation or to the output of the pulse shaper 163 for standardizing. The phase shifter 181 is automatically driven or controlled according to the magnitude and polarity of the output voltage of the discriminator 184 to alter the phase of the signal passed by the amplifier 182 to the discriminator 184 so as to keep the discriminator output at zero. Conveniently the discriminator has an output representative of the sine of the phase difference of the discriminator inputs and so the phase shifter 181 is controlled to "home" onto a zero discriminator output with the two discriminator inputs in phase. It will be seen that the control for the phase shifter 181 constitutes a closed servo loop system. It is desirable that this servo system be provided with a rate memory or velodyne control so that, if there is any interruption of input, the phase shifter 181 continues to rotate at its previous speed. The phase indication given by the calibration on the phase shifter 181 is standardizing by paralleling the inputs of amplifiers 180 and 183 by means of the switch 169 and, in this particular arrangement, by mechanically shifting the calibrated indicator member on the phase shifter 181 to give zero reading when the inputs of amplifiers 180 and 183 are paralleled. In this particular arrangement, a fixed phase relationship is maintained between the outputs of amplifiers 182 and 183 and thus the output of amplifier 182 has a fixed phase relationship to the received 9f signal input to the amplifier 183. The output of amplifier 182 is therefore an uninterrupted equivalent to the received $9f$ signal. As will be described later, this phase preservation system is made non-responsive to the short duration alternate transmissions when the $9f$ signal is radiated from the red slave transmitter and so provides, in effect, a storage system holding continuously the phase of the normal $9f$ transmissions received from the green slave transmitter. By mixing the output from the amplifier 182 with the output of an $8f$ receiver channel amplifier 185 in a mixer stage 186, an output of frequency $1f$ is obtained which, during the period of the alternate transmissions, has a fixed phase relation to the difference phase of the two transmissions from the green slave transmitter, that is to say between the normal $9f$ transmissions stored in the receiver and the short duration alternate transmissions of frequency $8f$. The $1f$ output from the mixer 186 is fed to the input of a $1f$ amplifier 187, the output of which is phase compared, by means of a phase indicating discriminator 188, with the $1f$ output of a $1f$ amplifier 189, the input of which is coupled to the output of the pulse shaper 163. As the output of the amplifier 187 is representative of a virtual $1f$ signal received from the green slave transmitter and the output of amplifier 189 is representative of a virtual $1f$ signal received from the master station, the phase indication on the indicator of discriminator 188 (after standardization using switch 169 to connect the inputs of amplifiers 183 and 185 in parallel with the inputs of amplifiers 180, 189) is a coarse indication with respect to the normal $9f$ pattern produced by the master and green slave stations and is used in conjunction with the finer pattern indicator of the calibrated phase shifter 181. In this particular arrangement the coarser pattern is at an effective frequency of $1f$ while the finer pattern is at an effective frequency of $9f$. The coarse pattern can be used, in the known way, to resolve possible ambiguities in the more accurate positional indication provided by the finer pattern. The coarse pattern may be referred to as a "lane identification" pattern since it serves to indicate or identify the particular lane (i.e. a region between two equi-phase curves representing one cycle of phase variation in the finer pattern) out of a set of nine adjacent lanes. As the required signals for the coarser pattern are only available for the mixer 186 during the short period alternate transmissions, the discriminator 188 incorporates switch-operated means, controlled by the switching means 178, so that an output from the phase angle discriminating means is applied to the indicator of the discriminator only during these short period alternate transmissions. It is desirable to retain the indication between these periods; this may readily be done for example by using a phase angle indicating meter with no return spring on the pointer so that the pointer remains in the position in which it has been set until a further signal is applied to the meter during the next period of the required alternate transmissions.

It has to be ensured that the phase shifter 181 is not affected by the short duration $9f$ signals received from the red slave during the alternate transmissions. The time constant of the servo loop may prevent any appreciable alteration of the phase shifter during this period but, if necessary, the switching means 178 may be arranged to interrupt the operation of the phase shifter during these short periods.

The units 180–189 illustrate one manner of obtaining coarse and fine pattern indications for one slave and the master station. Generally, in the receiving apparatus similar units would be provided for obtaining coarse and fine patterns with respect to each of the slave stations. In FIGURE 3, there is shown, however, for convenience a slightly different manner of obtaining coarse and fine patterns for the master and red slave stations. The normal $8f$ pattern for the master and red slave stations is given, in FIGURE 3, by an $8f$ phase difference indication provided by a discriminator 190 incorporating an indicating meter, this discriminator comparing $8f$ signals from two amplifiers 191 and 192. Amplifier 191 receives an $8f$ input from the pulse output of pulse shaper 163. The amplifier 192 receives its input from an $8f$ oscillator 193 which is phase and frequency locked to the $8f$ input of the previously mentioned $8f$ amplifier 185 by means of a phase discriminator 194. The $8f$ input to the amplifier 192 from the oscillator 193 is thus phase locked to the received $8f$ during the normal transmissions. The phase control of the $8f$ oscillator 193 has a very long time constant and thus the short periods of erroneous control signals from the discriminator 194 arising during the alternate short period transmissions when an $8f$ signal is received from the green slave will have negligible effect on the oscillator phase. The use of long time constants places limitations on the maximum possible speed of the vehicle in which the receiver is used but this difficulty can be overcome by removing the phase control voltage applied to the oscillator 193 by the discriminator 194 during the short periods of alternate transmissions. This switching of the control voltage, if required, may be effected by the switching means 178.

For the red slave-master system, the lane identification or ambiguity resolving $1f$ pattern indication, for resolving ambiguities of the normal $8f$ pattern, is provided by an indicating phase discriminator 195 to one input of which is applied the output of a $1f$ amplifier 196 having its input coupled to the output of the pulse shaper 163. The other input to the phase discriminator 195 is obtained from a $1f$ amplifier 197 which amplifies a $1f$ signal obtained by a mixer 198 which mixes the $8f$ output of the oscillator 193 with the $9f$ output from the $9f$ receiver amplifier 183. As the required $9f$ signals for the coarser red slave pattern are only available for the mixer 198 during the short period alternate transmissions, the discriminator 195 incorporates switch-operated means, controlled by the switching means 178, so that the phase indicator is only operated during these short period transmissions. The phase indicator preferably holds each indication until the next short period transmission. The red slave-master pattern phase indications are standardized using the switch 169 in a manner analogous to the previously described standardizing operations.

Although FIGURE 3 shows different arrangements for the $8f$ and $9f$ patterns, in practice identical circuit arrangements would preferably be employed. There are a number of other circuit arrangements which will provide the same phase differences for the discriminators 184, 188, 190 and 195. This is especially so with the introduction of locally generated heterodyne signals which alter the frequencies of the discriminator inputs by the addition or subtraction of equal phase change in both inputs of the discriminator. It is well known that a heterodyne frequency change of both inputs to a discriminator using a common heterodyne signal source need not alter the phase difference measurement of the discriminator.

The receiver of FIGURE 3 enables the position line with respect to the red slave to be determined at effective frequencies of $8f$ and $1f$. The position line may also be determined at an effective frequency of $24f$, for example by using frequency multiplying techniques to produce comparison signals of $24f$ from each of the radiated $6f$ and $8f$ signals during the normal transmission periods. The indications at $8f$ and $1f$ may be used as intermediate and coarse indications for resolving ambiguities in the $24f$ pattern. Similarly the $9f$ and $1f$ indications for the green slave may be used to resolve ambiguities in an $18f$ pattern.

Figure 4:
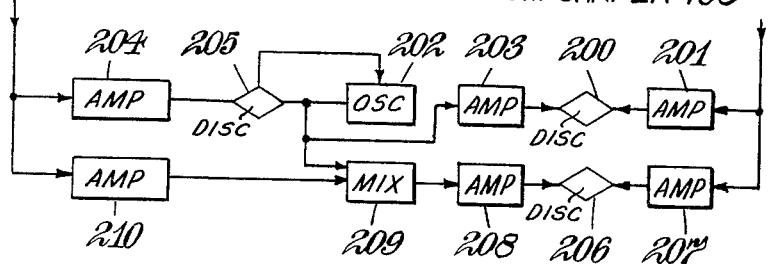
FIGURE 4 is a block diagram illustrating further equipment for use in the receiving apparatus of FIGURE 3.

The receiver of FIGURE 3 shows one arrangement for obtaining indications with respect to the red slave-master pattern and the green slave-master pattern. If a purple slave is employed an additional positional indication may be obtained with respect to a purple slave-master pattern by providing additional equipment which in general would be identical with that used for obtaining the other indications apart from the necessary frequency changes. FIGURE 4 illustrates one form for such additional equipment and it will be seen that it is similar to that shown for the red slave pattern in FIGURE 3. Assuming the purple slave transmitter normally radiates a signal of frequency 5f, the indication with respect to a 5f pattern is obtained from a discriminator 200 phase comparing a 5f signal from a 5f amplifier 201 amplifying the 5f component of the output from the pulse shaper 163 with a 5f signal obtained from a 5f oscillator 202 via a 5f amplifier 203. The oscillator is frequency and phase locked to the received 5f signals from a 5f receiving channel amplifier 204 by means of a phase discriminator 205. The coarse pattern indications are provided by a phase discriminator 206, which, during the short period alternate transmissions, compares and indicates the phase relation of a 1f signal obtained from the pulse shaper 163 via a 1f amplifier 207 with a 1f signal obtained from a 1f amplifier 208 which amplifies the 1f output of a mixer 209 in which the 5f output of oscillator 202 is mixed with a 6f signal from a 6f receiving channel amplifier 210. It will be seen that the construction of this purple slave pattern receiver shown in FIGURE 4 is exactly the same (apart from the different frequencies employed) as the red slave pattern receiving equipment of FIGURE 3 and, for this reason, no further description of its construction or operation will be given.

Figures 5, 6:
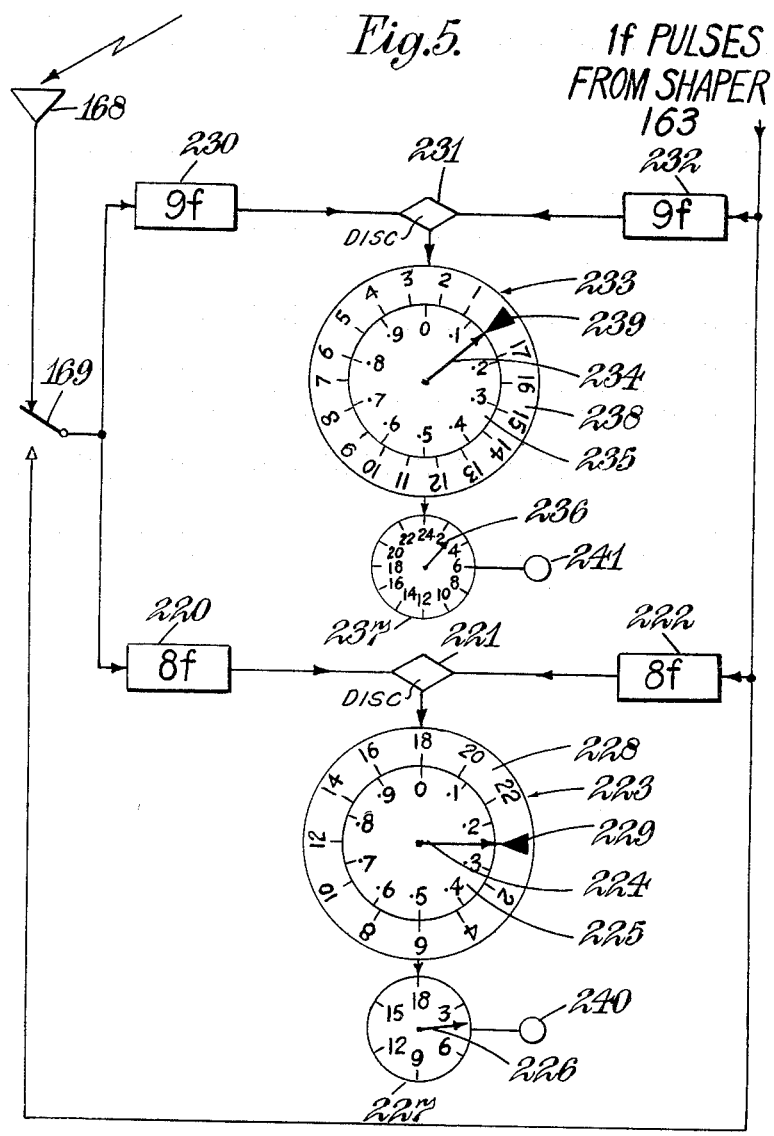
FIGURE 5 is a diagram illustrating another form of receiving apparatus.

In the slave transmitting stations and in the mobile receiving equipment, it is necessary to preserve phase information during intervals of transmissions and apparatus for this purpose has been described. There are a number of ways of preserving phase information from a control signal for use during breaks in the control signal. In FIGURE 3, the phase of the received 8f signal is preserved in the 8f oscillator 193. The phase of the received 9f signal is preserved in the summation signal of a 9f signal and the frequency or phase change of the phase shifter 181. Phase expresses a relation with some reference such as time or a reference signal. The phase of a received signal such as the 8f signal can therefore be preserved at any frequency including zero frequency depending on the choice of reference. If in FIGURE 3 the input to the 8f amplifier 191, is used as a reference signal the preserved phase of the received normal 8f signal is given by the normal 8f pattern indicator of discriminator 190. This conception of phase preservation leads to a semi-mechanical equivalent for some of the electrical circuits of FIGURE 3. This apparatus making use of considerably simplified electrical circuits is shown in FIGURE 5 which figure illustrates those parts of the receiving apparatus outside the rectangle 160 of FIGURE 3. As will be apparent from the following description, the apparatus of FIGURE 5 provides exactly the same information as is provided by the apparatus of FIGURE 3. In the arrangement of FIGURE 5, the received 8f signal picked up by antenna 168 is passed through an amplifier 220 to one input of a phase discriminator 221. The second input to the discriminator is provided by the 8f component, of the 1f pulses from pulse shaper 163, this 8f component being amplified by amplifier 222. The discriminator 221 controls a phase indicator 223 which has a phase (or fraction of a cycle) indicator with a pointer 224 moving over a fixed circular scale 225. The phase indicator drives, through gearing, the pointer 226 of an integrating indicator 227. A calibrated rotatable ring 228 is adjustable around the circular scale 225 to align an index mark 229 on the ring with the fractional pointer 224 during the time of normal transmissions, that is to say when the 8f signal is radiated from the red slave station. During these normal transmissions, the pointer 224 indicates the fraction of a lane and the integrating indicator 227 shows the integrated number of lanes thereby giving the information given by discriminator 190 in FIGURE 3.

The 9f signals are utilized in a similar way, the received 9f signal being fed by an amplifier 230 to one input of a discriminator 231, the other input of which is obtained from a 9f amplifier 232 energized from the pulse shaper 163. The discriminator 231 drives an indicator 233 having a pointer 234 traversing a circular scale 235 indicating fractions of a lane. The meter might, for example, have a permanent magnet rotor and have orthogonal stator coils energized respectively by direct voltages from the phase discriminator proportional to the sine and cosine of the phase angle between the two inputs to the discriminator. The pointer 234, through gearing, drives pointer 236 of an integrating counter 237. A rotatable calibrated ring 238 around the scale 235 has an index mark 239. During the normal transmissions the pointers 234, 236 give indications corresponding to those provided by the phase shifter 181 of FIGURE 3. Mechanical reset devices 240, 241 are provided for resetting the indicators 227, 237 respectively.

The phase shifts through the amplifiers 220, 222, 230 and 232 are standardized by using switch 169 to connect the inputs of all four amplifiers in parallel to the output of the pulse shaper 163.

During the short period alternate transmissions, the difference between the preserved 8f phase represented by index 229 (which has been set during the normal transmissions) and the indication of the fractional 9f phase represented by the position of pointer 234 on indicator 233 (which during these transmissions takes up a position in accordance with the phase of the 9f signal radiated from the red slave) defines the lane number of the normal 8f pattern. The reading is facilitated by the calibration marks on ring 228, the position of the pointer 234 being mentally transferred to the ring 228. The reading so obtained may be used to reset the integrating indicator 227, by means of reset control 240, if such resetting is necessary. Similarly the lane number of the normal 9f pattern from the green slave may be obtained by the difference between the position of pointer 224 and the index 239 during the short period alternate transmissions. The very simple construction thus described is however not very convenient because the reading has to be obtained by transferring the fractional reading on one meter to the other meter. This difficulty can readily be overcome by switching the connections to interchange the signals applied to the two meters during the short period alternate transmissions so that direct readings of the required lane numbers are obtained by noting the positions of the pointers 224 and 234 on their respective calibration ring scales 228 and 238. With such switching of the connections, which may readily be effected by the switching means 178, it is not however possible to use mechanical alteration of the indicator position to adjust for phase standardization or referencing. Such standardization would therefore have to be effected by adjustable phase shifters in one input to each of the discriminators 221 and 231.

The transmitting and receiving apparatus described above may be used by an unlimited number of craft carrying mobile receivers, all utilizing the same transmissions. Phase comparison radio positions fixing systems however are also commonly used for survey work. Radio aids for survey work may have wide limits in the control of transmission and reception of signals since the number of receivers in use is generally small and, in many cases, there is but one mobile receiver in use. In such cases, it may be desirable to have the lane identification signals, i.e. the short period alternate transmissions available on request rather than at fixed time intervals as the integrating counter can carry on correctly for a full days surveying work and the alternate transmissions can interfere with the smooth functioning of a track plotter device. For over water survey or for use where only one ship is employed it is often desirable to combine the receiver and the master station. In this case, the system becomes a ranging system rather than a hyperbolic system as the difference distance represented by each measured phase reading is equal to the separation of the ship from a slave station and always has the same sign. In combining the master station and the receiver, the block 160 of FIGURE 3 is no longer required since the $1f$ output obtained from this block 160 may be provided directly by the $1f$ output from the pulse generator 10 of the master station of FIGURE 1. The output $1f$ pulse generator thus has the dual role of providing reference signals for the receiver and the transmitter phase so that the synchronization is now inherent. Since in a survey chain, generally only two slave transmitters are employed, the $6f$ and $5f$ signals may be radiated only from the master station and the alternate master transmission on frequency $5f$ may be used for synchronizing the periods of alternate transmission from the slave stations thereby avoiding the necessity of providing any further signalling system.

It will be seen that in the embodiments of the invention more particularly described, information is transmitted from all the stations all the time but only one signal is transmitted from any station at any time. Each station has to transmit only on two alternative frequencies and the pairing of the frequencies is such as to have the minimum frequency spread, which simplifies the frequency switching. Each transmitting station need be equipped with only one transmitter, a single tuned antenna and a relatively simple two-way switching means for altering the transmitter and antenna tuning. The weight increase of such a dual frequency transmitter over the weight of a single frequency transmitter may be negligible.

I claim:

1. A phase comparison navigation system comprising a master station radiating alternately two signals having a frequency difference $mf$ and two slave stations each radiating alternately two signals having a frequency difference $nf$ where $m$ and $n$ are integers, each slave station radiating signals of one and then the other of the two frequencies, the two slave transmissions being switched synchronously so that the two slave stations always radiate different frequencies and wherein, at a mobile receiver, there are provided phase storage means for storing representations of the phase of at least one of the signals from each station and separate phase indicating means associated with each slave station utilizing a stored signal from said phase storage means and the alternately transmitted signal from its associated slave station and the master station to determine positional lines with respect to a pattern of equiphase lines between the master station and the said slave station equivalent to the pattern which would be provided by a phase comparison of received signals, after conversion to a common frequency if the master station radiated a signal of the difference frequency $mf$ and the slave station radiated a signal of the difference frequency $nf$, phase locking means being provided at the radiating stations to lock the radiated signals from each station in phase with one another and to lock the phase of the radiations from the three stations to maintain said equiphase pattern fixed with respect to the radiating stations.

2. A phase comparison navigation system wherein there are provided a master station radiating alternately two signals of frequency $m_1f$ and $m_2f$ where $m_1$ and $m_2$ are different integers and a pair of slave stations each radiating alternately signals of frequency $n_1f$ and $n_2f$ where $n_1$ and $n_2$ are different integers differing from $m_1$ and $m_2$, the two slave station transmissions being switched synchronously so that the two slave stations always radiate different frequencies and all the radiated signals being locked in phase and wherein, at a mobile receiver, phase storage means are provided for storing representations of the phase of at least one of the signals from each station whereby, by utilizing a stored signal from said phase storage means and the alternately transmitted signal from each station, phase indications can be made to determine positional lines with respect to patterns of equiphase lines between the master station and each of the two slave stations equivalent to the patterns which would be obtained by a phase comparison of received signals, after conversion to a common frequency if the master station radiated a signal of the difference frequency between $m_1f$ and $m_2f$ and if each of the slave stations radiated a signal of the difference frequency between $n_1f$ and $n_2f$.

3. A phase comparison navigation system wherein there are provided a master station radiating alternately two signals of frequency $m_1f$ and $m_2f$ where $m_1$ and $m_2$ are different integers having a difference of unity and a pair of slave stations each radiating alternately signals of frequency $n_1f$ and $n_2f$ where $n_1$ and $n_2$ are different integers differing by unity and differing from $m_1$ and $m_2$, the two slave station transmissions being switched synchronously so that the two slave stations always radiate different frequencies and all the radiated signals being locked in phase and wherein, at a mobile receiver, phase storage means are provided for storing representations of the phase of at least one of the signals from each station whereby, by utilizing a stored signal from said phase storage means and the alternately transmitted signal from each station, phase indications can be made to determine positional lines with respect to patterns of equiphase lines between the master station and each of the two slave stations equivalent to patterns which would be obtained if $1f$ signals were radiated from all the stations.

4. A phase comparison navigation system as claimed in claim 3 wherein a third slave station is provided radiating alternately on frequencies $m_2f$ and $m_1f$ the transmissions being switched synchronously with the master transmissions so that the master and third slave always radiate different frequencies.

5. A phase comparison navigation system comprising a master station radiating alternately two signals having a frequency difference $mf$ and a slave station radiating alternately two signals having a frequency difference $nf$ where $m$ and $n$ are integers, the alternate transmissions comprising relatively long duration periods of normal transmission with shorter duration periods of radiation on the alternate frequency and wherein, at a mobile receiver, there are provided phase storage means for storing representations of the phase of at least one of the signals from each station and phase indicating means utilizing a stored signal and the alternately transmitted signal from each station to determine positional lines with respect to a pattern of equiphase lines between the master station and a slave station equivalent to the pattern which would be provided if the master station radiated a signal of the difference frequency $mf$ and the slave station radiated a signal of the difference frequency $nf$, phase locking means being provided at the radiating stations to lock the radiated signals from each station in phase with one another and to lock the phase of the radiations from the two stations to maintain said equiphase pattern fixed with respect to the radiating stations.

6. A phase comparison navigation system as claimed in claim 5 wherein the mobile receiver is arranged to effect a fine position determination during the periods of normal transmission and to effect a coarser determination, to resolve any ambiguities in the finer determination, during the shorter duration periods of alternate operation.

7. A radio navigation system in which a position line is determined by indicating the difference in time of propagation to a mobile receiver of signals emitted from spaced master and two spaced slave transmitting stations, wherein the master station is arranged to radiate alternately signals of frequency $m_1f$ and $m_2f$ where $m_1$ and $m_2$ are integers differing by one and $f$ is the fundamental frequency of the system and wherein the two slave stations are arranged to radiate alternately signals of frequency $n_1f$ and $n_2f$ the frequency switching being such that the two slave stations always radiate different frequencies, where $n_1$ and $n_2$ are integers differing by one and differing from $m_1$ and $m_2$, all the radiated signals being locked in phase, and wherein the mobile receiver comprises means for separately receiving the radiated signals of different frequency, a first phase preserving means for preserving the phase of the received $m_1f$ signal from the master station during the transmission of the $m_2f$ signal, means for utilizing the phase preserved by the first phase preserving means and the received $m_2f$ signal to maintain a unique phase relation between the pulses from a pulse generator at a $1f$ repetition rate and the received master transmissions, and a separate second phase preserving means associated with each slave station converting information from the received signals from the associated slave station of one frequency into a retained phase reference utilised in conjunction with the received signals of the alternately transmitted frequency and said pulses at a $1f$ repetition rate to provide an indication of a position line in fractional units of measurement equivalent to the units provided by the phase difference in transit time of slave and master signals each having a virtual frequency of $1f$.

8. A radio navigation system as claimed in claim 7 wherein there are provided phase indicating means indicative of the phase relation between the received slave signal of frequency $n_1f$ and the phase of the $n_1$th harmonic component of the $1f$ pulses thereby providing a phase indication defining a line of position in fractional units of measurement equivalent to the units provided by the phase difference in transit time of slave and master signals each having a virtual frequency of $n_1f$.

9. A radio navigation system as claimed in claim 8 wherein said phase indicating means include means arranged to receive phase adjustment from the received $n_1f$ slave signal in order to preserve the phase of this signal during the time of transmission of the $n_2f$ signal.

10. A radio navigation system in which a position line is determined by indicating the difference in time of propagation to a mobile receiver of signals emitted from spaced master and slave transmitting stations, wherein the master station is arranged to radiate alternately signals of frequency $m_1f$ and $m_2f$ where $m_1$ and $m_2$ are integers differing by one and $f$ is the fundamental frequency of the system and wherein the slave station is arranged to radiate alternately signals of frequency $n_1f$ and $n_2f$ where $n_1$ and $n_2$ are integers differing by one, all the radiated signals being locked in phase, wherein the frequencies $m_1f$ and $n_1f$ are normally transmitted with short periods of the alternate transmissions on frequencies $m_2f$ and $n_2f$, and wherein the mobile receiver comprises means for separately receiving the radiated signals of different frequency, a first phase preserving means for preserving the phase of the received $m_1f$ signal from the master station during the transmission of the $m_2f$ signal, means for utilizing the phase preserved by the first phase preserving means and the received $m_2f$ signal to maintain a unique phase relation between the pulses from a pulse generator at a $1f$ repetition rate and the received master transmissions, and a second phase preserving means converting information from the received slave signals of frequency $n_1f$ into a retained phase reference utilized in conjunction with the received $n_2f$ signals and said pulses at a $1f$ repetition rate to provide an indication of a position line in fractional units of measurement equivalent to the units provided by the phase difference in transit time of slave and master signals each having a virtual frequency of $1f$.

11. A radio navigation system as claimed in claim 10 wherein said first phase preserving means are arranged to receive phase adjustment from the received $m_1f$ master signal in order to preserve a master phase reference for use during the periods of the alternate transmissions and wherein there are provided indicating means indicating the phase relationship between the alternate master transmissions and the preserved master phase reference and means for utilizing this indicated phase difference to establish a unique phase relation between an uninterrupted source of pulses of $1f$ repetition rate and the two received master signals.

12. A radio navigation system in which a position line is determined by indicating the difference in time of propagation to a mobile receiver of signals emitted from spaced master and slave transmitting stations, wherein the master station is arranged to radiate alternately signals of frequency $m_1f$ and $m_2f$ where $m_1$ and $m_2$ are integers differing by one and $f$ is the fundamental frequency of the system and wherein the slave station is arranged to radiate alternately signals of frequency $n_1f$ and $n_2f$ where $n_1$ and $n_2$ are integers differing by one, all the radiated signals being locked in phase, and wherein the mobile receiver comprises means for separately receiving the radiated signals of different frequency, a generator generating pulses of a repetition frequency of $1f$ to have harmonic components of frequencies $m_1f$, $m_2f$, $n_1f$ and $n_2f$ in fixed phase relationship with one another, means for controlling the generator to maintain a fixed phase relationship between the received $m_1f$ signals and the $m_1f$ component of the pulses, means for controlling the pulses to obtain a fixed phase difference between the received $m_2f$ signal and the $m_2f$ component of the pulses, a first phase discriminator providing an indication representative of the phase difference between the phase of the received $n_1f$ signal and the phase of the $n_1$th harmonic of the $1f$ pulses and a second phase discriminator providing an indication representative of the phase difference between the phase of the signal derived from the difference of the received $n_1f$ and $n_2f$ signals and the phase of the $1f$ component of the $1f$ pulses.

13. A radio navigation system having a master station transmitting signals of at least one frequency $m_1f$ where $m_1$ is an integer and $f$ the fundamental frequency of the system and two slave stations each transmitting two signals alternately of frequencies $n_1f$ and $n_2f$, where $n_1$ and $n_2$ are different integers different from $m_1$ and with the difference between them less than either of them, each frequency being radiated only by one station at a time and all the transmissions being locked in phase, and wherein a mobile receiver includes means for storing representations of the phases of the $n_1f$ and $n_2f$ signals radiated simultaneously by the slave stations during one of the alternate periods of operation and means operative during the other alternate periods of operation for utilizing the stored phase representations with the received signals to determine the phase relation between virtual signals of frequency $(n_1-n_2)f$ radiated from each of the slave stations and signals derived from the received master transmissions.

14. A mobile receiver for a phase comparison radio navigation system having a master station and two or more slave stations, at least each slave station radiating on two different frequencies in alternate periods, each station radiating only one frequency at a time and all the radiated signals being of harmonically related frequencies and locked in phase, said mobile receiver including a separate storage means for each slave station, which storage means are operative simultaneously during one of the alternate periods to receive different frequency signals from the different slave stations and to store information representative of the phases of these different frequency signals and means for utilizing the stored information in conjunction with the signals received during the next period when the stations are transmitting on different frequencies to provide, at the receiver, information representative of the phases of virtual transmissions at frequencies equal to the differences of the frequencies of the two transmissions from each slave station for phase comparison with comparison signals derived from signals received from the master station wherein said storage means for each slave comprises a phase adjuster for adjusting the phase of a signal derived from two received master signals to give an output signal of the frequency of one of the slave transmissions, and control means operative during the periods of transmission of that frequency by the slave to compare the phase of the received signal with the output of the phase adjuster and to alter the phase adjuster to maintain a predetermined phase relationship.

15. A transmitting system for a radio navigation system comprising at least three spaced transmitters, each arranged to radiate all the time but only one signal being transmitted from any transmitter at any time wherein each transmitter radiates one of four different frequencies which are all harmonics of a common fundamental frequency with all the stations radiating different frequencies which are all locked in phase and each transmitter radiating alternately on two different frequencies which differ in frequency by said fundamental frequency but which are locked in phase.

16. A phase comparison navigation system wherein there are provided a master station radiating alternately two signals of frequency $m_1 f$ and $m_2 f$ where $m_1$ and $m_2$ are different integers and a pair of slave stations each radiating alternately signals of frequency $n_1 f$ and $n_2 f$ where $n_1$ and $n_2$ are different integers differing from $m_1$ and $m_2$, the difference frequency $(m_1 - m_2) f$ being equal to the difference frequency $(n_1 - n_2) f$, the two slave station transmissions being switched synchronously so that the two slave stations always radiate different frequencies and all the radiated signals being locked in phase and wherein, at a mobile receiver, phase storage means are provided for storing representations of the phase of at least one of the signals from each station whereby, by utilizing a stored signal from such phase storage means and the alternately transmitted signal from each station, phase indications can be made to determine positional lines with respect to patterns of equiphase lines between the master station and each of the two slave stations equivalent to the patterns which would be obtained if the master station radiated a signal of the said difference frequency and if each of the slave stations radiated a signal of the said difference frequency.

References Cited by the Examiner

UNITED STATES PATENTS 2,844,816    7/58    O'Brien et al. ---------- 343—105

OTHER REFERENCES

Caseleman et al.: VLF Propagation Measurements for the Radux-Omega Navigation System, Proceedings of the IRE, pages 829–839, May 1959.

CHESTER L. JUSTUS, *Primary Examiner.*